May 22, 1928.
E. A. ROGERS
1,670,988
DEVICE FOR MAINTAINING A UNIFORM QUANTITY OF OIL
IN THE CRANKCASE OF AN AUTOMOBILE
Filed Oct. 4, 1927
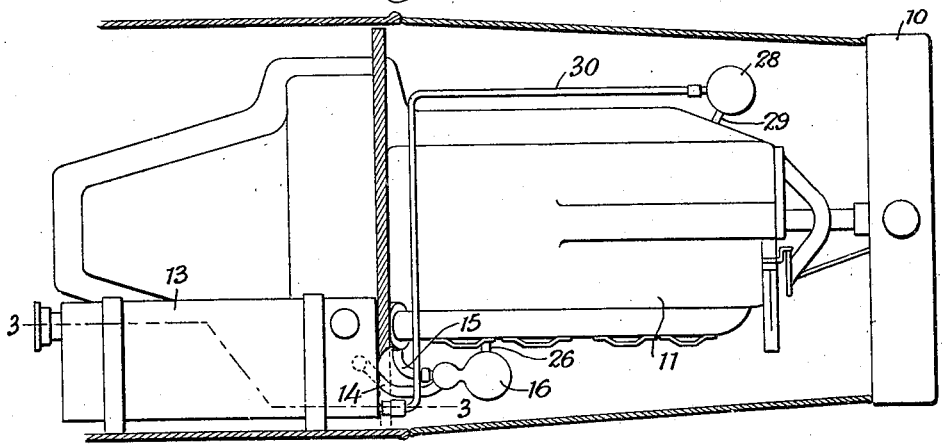
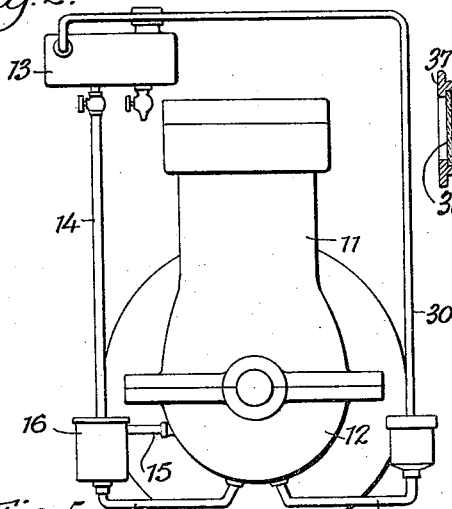
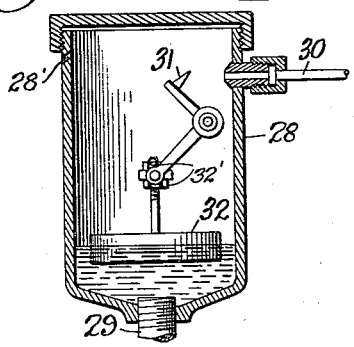
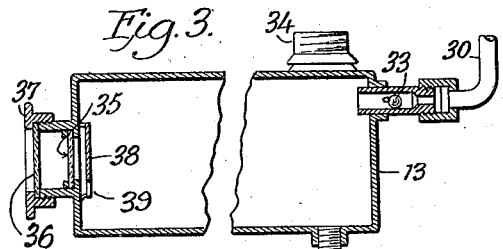
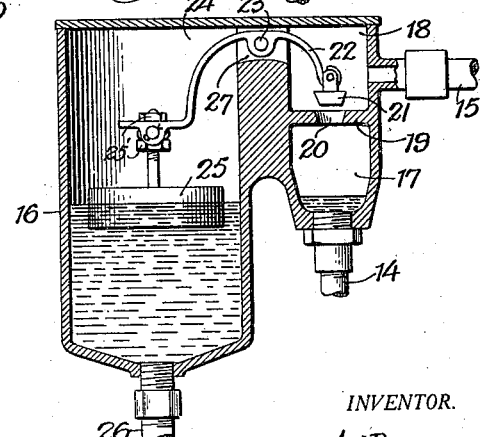
INVENTOR.
Eugene A. Rogers,
BY
ATTORNEY.

Patented May 22, 1928.

1,670,988

UNITED STATES PATENT OFFICE.

EUGENE A. ROGERS, OF TAKOMA PARK, MARYLAND.

DEVICE FOR MAINTAINING A UNIFORM QUANTITY OF OIL IN THE CRANK CASE OF AN AUTOMOBILE.

Application filed October 4, 1927. Serial No. 224,012.

My invention relates to a device for maintaining a uniform or constant supply of lubricating oil in the crank case of an automobile engine or the like vehicle, and it is an object of the invention to provide an improved device of this character which will effectively perform the function for which it was designed.

It is also an object of the invention to produce, in a structure of this character, means for preventing the supplying of a surplus quantity of lubricating oil to the crank case, thus avoiding deleterious effects, such as fouling of the spark plugs, as is common with this type of device when the automobile upon which it is applied is upon a hill or is in inclined position, all as will be hereinafter more particularly described and claimed.

Referring to the drawings, in which like reference characters indicate similar parts:

Fig. 1 is a fragmentary top plan view of an automobile illustrating the application of my invention.

Fig. 2, a fragmentary front elevation of an automobile motor having my device applied thereto.

Fig. 3, a longitudinal section through an auxiliary tank for containing lubricating oil.

Fig. 4, a central vertical section of a casing having a float-controlled valve for regulating the quantity of lubricating oil supplied to the crank case, and Fig. 5, a central vertical section of a casing having a float-controlled valve for regulating the supply of air to the auxiliary oil tank shown in Fig. 3.

In the drawings reference character 10 indicates a conventional type of automobile having a motor 11 and a crank case 12. As is well known, the working parts of the motor of an automobile are often injured on account of excessive heat generated by friction when the amount of oil in the crank case gets too low and the efficiency of the motor is also impaired by a wide variation in the amounts of oil used. I, therefore, provide an auxiliary lubricating oil tank 13 for containing an extra supply of oil and connect the same by means of pipes 14 and 15 and an interposed valve casing 16 with the crank case 12. Oil may flow from the auxiliary tank 13 through the last mentioned elements into the crank case.

The valve casing 16 is provided with chambers 17 and 18 separated by a web 19, the chamber 17 being in direct communication with the inlet pipe 14 and being adapted to receive oil directly therefrom, and the chamber 18 being in direct communication with the discharge pipe 15 and being adapted to permit oil to pass directly thereinto. A beveled opening or valve passage 20 is provided in the web 19 and a valve 21 is provided for closing said opening, said valve being pivoted on a lever 22 mounted on a pivot 23.

The valve casing 16 is also provided with a float chamber 24 into which projects the end of the lever 22, opposite the valve 21, and upon which end is pivotally mounted a float 25, nuts 25' being threaded upon the stem of the float for varying the position of the float. The bottom of the float chamber 24 is connected by means of a pipe 26 with the bottom of the crank case 12 and oil entering the float chamber from the crank case will operate the float and control the valve 21. A small passage 27 in which the pivot 23 is located permits air to pass from the upper part of the float chamber through the chamber 18 and pipe 15 into the crank case when oil from the crank case passes into the chamber 24. From the foregoing it will be readily understood that the level of oil in the crank case will govern the operation of the float 25 which controls the valve 21 and supply of oil from the auxiliary tank 13 to the crank case.

The mechanism just described will only operate satisfactorily as long as the automobile is on level roadway or when running up hill, but when running down hill the oil in the crank case will rush to the front of the crank case and cause an excessive amount of oil to be fed from the auxiliary tank into the crank case. In order to overcome this difficulty, I have provided means for controlling the outlet of oil from the auxiliary reservoir or oil tank 13, said means comprising a control for the air vent or inlet to the auxiliary oil tank 13.

In order to perform the foregoing function, I provide a float chamber 28 connected by means of a pipe 29 with the bottom of the crank case 12 adjacent the front end of the same, said chamber having an air vent 28'. A small air pipe 30 connects said float chamber 28 with the auxiliary oil tank 13 and a needle valve 31 is controlled by a float 32 so that when the front end of the crank case is lowered, as in descending a hill, the float will rise and cause the valve 31 to close the passage through the pipe 30. The stem of the float is also threaded and provided with nuts 32' for permitting adjustment of the float.

In order to prevent oil from entering the pipe 30, a ball valve 33 is provided, as shown in Fig. 3, at the point of connection of the pipe 30 with the tank 13. Oil may be poured into the tank 13 through an inlet in the top of the tank closed by a cap 34. A sight glass 35 is provided at the opposite end of the tank 13 for permitting the quantity of lubricant in the tank to be observed. A second safety glass 36 is carried by a cap 37, in order to prevent oil from getting into the automobile if the glass 35 should become broken. An added precaution comprises a metal guard 38 arranged over the inner side of the sight glass 35, said metal guard being provided with one or more arcuate slots 39 at its lower edge. The cap 37 is adapted to project through the instrument board of the automobile and serves to clamp the tank thereto.

It will be obvious to those skilled in the art that various changes may be made in my device without departing from the spirit of the invention; and I, therefore, do not limit myself to what is shown in the drawings, but only as indicated in the accompanying claims.

Having thus described my invention, what I claim as new and desire to secure by Letters Patent is:

1. Means for maintaining a uniform quantity of oil in the crank case of an automobile comprising an oil supply tank, a connection from said tank to the crank case, a valve for controlling said connection, a float for controlling said valve, a chamber for said float having communication with the crank case whereby the float may be operated according to the oil in the crank case, a second float chamber having communication with the crank case, a float in said chamber, an air pipe connecting the supply tank and the second float chamber, and a valve controlled by the float in the second float chamber for controlling the passage of air through said air pipe.

2. Means for maintaining a body of liquid constant in volume comprising an auxiliary supply, a connection between said body of liquid and said auxiliary supply, a float valve operated by said body of liquid for controlling the addition of liquid to the body from the auxiliary supply, means for admitting air to said auxiliary supply to permit the same to flow out, and a second float valve operated by said body of liquid for controlling said air-admitting means.

3. Means for maintaining a uniform quantity of oil in the crank case of a motor comprising an auxiliary oil tank, a float-controlled passage for oil between said tank and one end of the crank case, and a float-controlled passage for air between said tank and the other end of the crank case adapted to break the vacuum in said auxiliary oil tank.

4. Means for maintaining a uniform supply of oil in the base of a motor comprising an auxiliary oil tank, a passage forming communication between the bottom of said tank and one end of said base, a float operable by the oil in said base for controlling the flow of oil through said passage, a second passage forming communication between the top of said tank and the opposite end of said base, and a float operable by the oil in said base for controlling the flow of air into said tank, adapted to break the vacuum in said auxiliary oil tank.

5. Means for maintaining a uniform supply of oil in the base of a motor comprising an auxiliary oil tank, a passage forming communication between the bottom of said tank and one end of said base, a float operable by the oil in said base for controlling the flow of oil through said passage, a second passage forming an air communication between the top of said tank and the opposite end of said base, a float operable by the oil in said base for controlling the flow of air into said tank, and a check valve at the tank end of the passage which forms communication with the top of the tank for preventing the flow of oil into said passage.

6. Means for maintaining a uniform quantity of oil in the crank case of a motor comprising an auxiliary oil tank, a float-controlled passage for oil between said tank and one end of the crank case, a float-controlled passage for air between said tank and the other end of the crank case for maintaining a substantially uniform amount of oil in the crank case, and means for preventing oil from entering said air passage from said tank.

7. Means for maintaining a uniform quantity of oil in the crank case of a motor comprising an auxiliary oil tank, a float-controlled passage for oil between said tank and one end of the crank case, a float-controlled passage for air between said tank and the other end of the crank case for maintaining a substantially uniform amount of oil in the crank case.

8. In a lubricating system for maintaining a uniform quantity of oil in the crank case of a motor, an auxiliary oil tank, a float-controlled passage between said auxiliary oil tank and said crank case for admitting oil into the crank case, a sight glass in said tank, and a shield for said sight glass for preventing breakage of the glass by the oil surging against the same.

9. In a lubricating system for maintaining a uniform quantity of oil in the crank case of a motor, an auxiliary oil tank, a float-controlled passage between said auxiliary oil tank and said crank case for admitting oil into the crank case, a sight glass in said tank, and a shield for said sight glass for preventing breakage of the glass by the oil surging against the same, said shield comprising a plate having an opening through its lower portion for permitting oil to reach the glass.

In testimony whereof I affix my signature.

EUGENE A. ROGERS.